(12) United States Patent
Harris et al.

(10) Patent No.: US 7,073,009 B2
(45) Date of Patent: *Jul. 4, 2006

(54) VXS PAYLOAD MODULE AND METHOD

(75) Inventors: Jeffrey M. Harris, Chandler, AZ (US); Robert C. Tufford, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/839,841

(22) Filed: May 5, 2004

(65) Prior Publication Data

US 2005/0251606 A1    Nov. 10, 2005

(51) Int. Cl.
G06F 13/36    (2006.01)
G06F 13/00    (2006.01)

(52) U.S. Cl. ....................... 710/306; 710/316
(58) Field of Classification Search .............. None
See application file for complete search history.

(56) References Cited

U.S. PATENT DOCUMENTS 6,598,109 B1    7/2003  McAlister et al.
2004/0078506 A1*  4/2004  Wong et al. ............ 710/301
2004/0233652 A1* 11/2004  Sandy et al. ............ 361/788
2005/0099970 A1*  5/2005  Halliday ................. 370/321
2005/0226168 A1* 10/2005  Busch et al. ............ 370/254
2005/0251607 A1* 11/2005  Harris et al. ........... 710/301

OTHER PUBLICATIONS

"VXS: VMEbus Switched Serial, A novel and emerging architecture for embedded computing", Dr. Jeffrey M. Harris, Motorola Computer Group (presentation slides), 2001.*
VXS VMEbus Switched Serial Standard, VITA 41.0-200x, Revision 1.9, VITA Standards Organization, Nov. 14, 2003.*

* cited by examiner

Primary Examiner—Paul R. Myers
Assistant Examiner—Brian Misiura
(74) Attorney, Agent, or Firm—Kevin D. Wills

(57) ABSTRACT

A multi-service platform system (100) having a VXS backplane (104) includes a VXS payload module (102) coupled to the VXS backplane, and a switched fabric enabled mezzanine card (112) coupled to the VXS payload module, wherein the switched fabric enabled mezzanine card is coupled to directly communicate with the VXS backplane.

22 Claims, 4 Drawing Sheets

VXS PAYLOAD MODULE AND METHOD

RELATED APPLICATIONS

Related subject matter is disclosed in U.S. patent application entitled "METHOD AND APPARATUS FOR SWITCHING ON A VXS PAYLOAD MODULE" having application Ser. No. 10/840,076 and filed on the same date herewith and assigned to the same assignee.

BACKGROUND OF THE INVENTION

Expansion cards can be added to computer systems to lend additional functionality or augment capabilities. Current expansion cards interface and communicate with computer systems using primarily a multi-drop parallel bus network architecture, such as Peripheral Component Interconnect (PCI) or VERSAmodule Eurocard (VMEbus). A multi-drop parallel bus architecture has the disadvantage that it can only be used to support one instantaneous communication between modules in a computer system or network. However, some applications have requirements for simultaneous high bandwidth transfers between modules that cannot be handled by the multi-drop parallel bus architecture.

In the prior art, expansion cards, particularly mezzanine cards, are placed on payload modules mounted in chassis-type computer systems, such as VMEbus type systems known in the art. The prior art method of interfacing the expansion cards requires the payload module to manage the mezzanine cards through use of a processor and bus onboard the payload module. This adds complexity and expense when adding additional functionality to the chassis-type computer system. Therefore, it is desirable to provide expansion cards in a chassis-type environment that support high-speed data transfers, while minimizing the complexity and expense of controlling the expansion cards from the payload module.

Accordingly, there is a significant need for an apparatus and method that overcomes the deficiencies of the prior art outlined above.

BRIEF DESCRIPTION OF THE DRAWINGS

Referring to the drawing.

Figure 1:
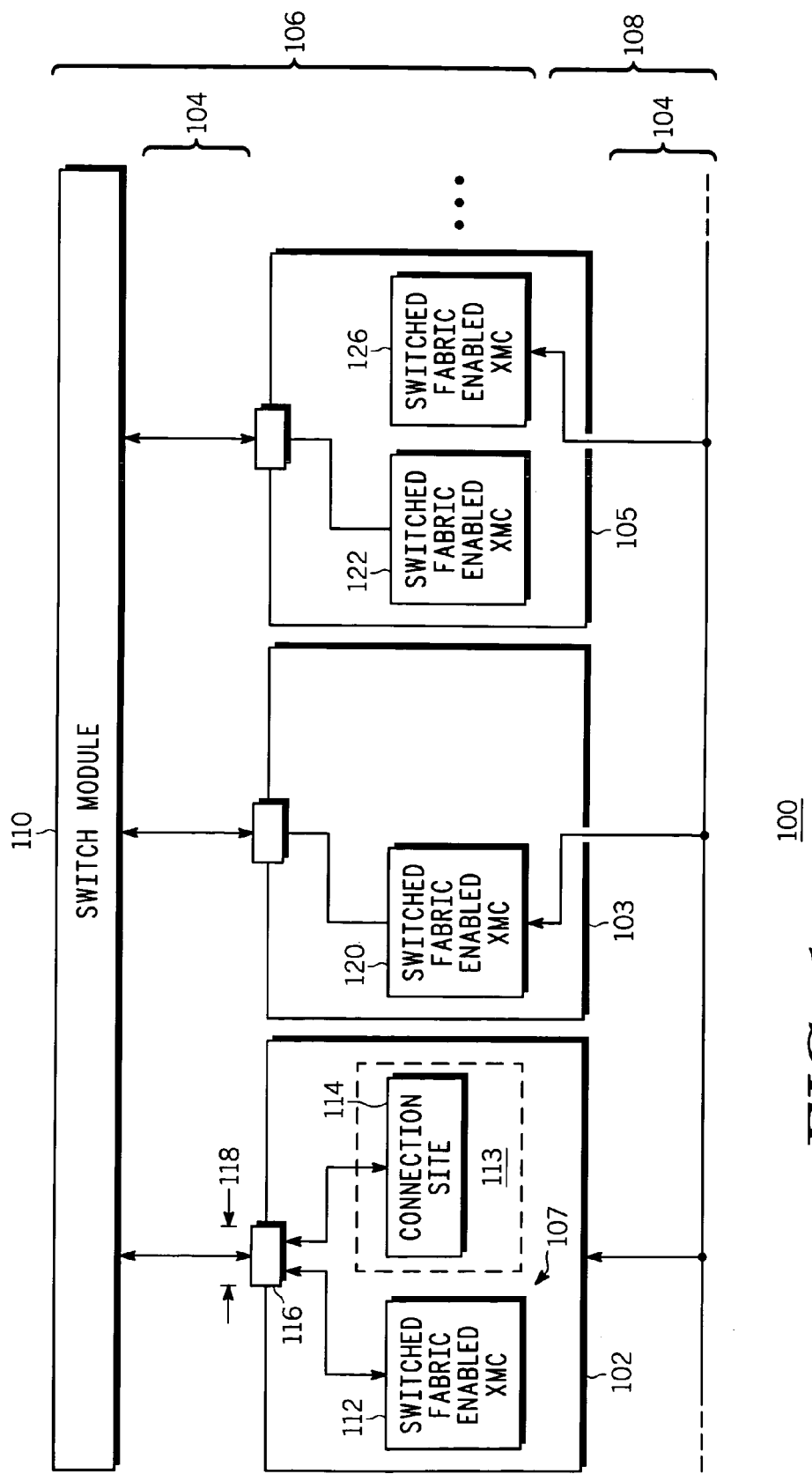
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. A multi-service platform system 100 can include one or more computer chassis, with software and any number of slots for inserting modules. Modules can add functionality to multi-service platform system 100 through the addition of processors, memory, storage devices, and the like. In one embodiment a backplane connector is used for connecting modules placed in the slots.

As an example of an embodiment, a multi-service platform system 100 can include one or more chassis and modules conforming to the VERSAmodule Eurocard (VMEbus) switched serial standard backplane (VXS) as set forth in VITA 41 promulgated by VMEbus International Trade Association (VITA), P.O. Box 19658, Fountain Hills, Ariz., 85269. VXS includes a packet switched network, known as a switched fabric 106, on a backplane coincident with the VMEbus parallel-type bus 108.

In an embodiment, multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules with communication among the various modules of multi-service platform system 100.

VMEbus network 108 is a parallel multi-drop bus network that is known in the art. VMEbus network 108 is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus network 108 can include VMEbus based protocols such as Single Cycle Transfer protocol (SCT), Block Transfer protocol (BLT), Multiplexed Block Transfer protocol (MBLT), Two Edge VMEbus protocol (2 eVME) and Two Edge Source Synchronous Transfer protocol (2eSST). VMEbus network 108 is not limited to the use of these VMEbus based protocols and other VMEbus based protocols are within the scope of the invention.

Switched fabric 106 can use switch module 110 as a central switching hub with any number of VXS payload modules 102, 103, 105 coupled to switch module 110. Switched fabric 106 can be based on a point-to-point, switched input/output (I/O) fabric, whereby cascaded switch devices interconnect end node devices. Switched fabric 106 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric 106 can be implemented by using one or more of a plurality of switched fabric network standards, for example and without limitation, InfiniBand™, Serial RapidIO™, FibreChannel™, Ethernet™, PCI Express™, Hypertransport™, and the like. Switched fabric 106 is not limited to the use of these switched fabric network standards and the use of any switched fabric network standard is within the scope of the invention.

In an embodiment of the invention, VMEbus network 108 and switched fabric 106 operate concurrently within multi-service platform system 100. In an example of an embodiment, VMEbus network 108 can operate as a control plane by synchronizing and organizing activities in multi-service platform system 100. Switched fabric 106 can operate as a data plane by transferring data between individual VXS payload modules 102, 103, 105. In this embodiment, data is transferred faster through the higher bandwidth switched fabric 106, while the VMEbus network 108 controls and manages the overall system. This has the effect of increasing the speed of multi-service platform system 100 that is based on VMEbus specifications since data transfers that are in excess of VMEbus network 108 bandwidth can take place using switched fabric 106.

In another embodiment of the invention, VMEbus network 108 can be used as the data plane and switched fabric 106 can be used as the control plane. In yet another embodiment of the invention, VMEbus network 108 and switched fabric 106 each can operate as both the control plane and the data plane.

Multi-service platform system 100 can include any number of VXS payload modules 102, 103, 105 coupled to VXS backplane 104. VXS payload modules 102, 103, 105 can include any number of switched fabric enabled mezzanine cards 112. VXS backplane 104 can include hardware and software necessary to implement a coincident parallel multi-drop bus 108 and a switched fabric 106.

In an embodiment, VXS payload module 102, 103, 105 can have a VMEbus board form factor. VMEbus form factor, including mechanical dimensions, electrical specifications, and the like are known in the art and set forth in the ANSI/VITA 1-1994 and ANSI/VITA 1.1-1997 standards.

In an embodiment, VXS payload module 102 can include any number of expansion cards, which can be for example, mezzanine cards. An exemplary mezzanine card can be a Common Mezzanine Card (CMC) having a CMC form factor. CMC form factor, including mechanical dimensions, electrical specifications, and the like, are known in the art and set forth in the Institute of Electrical and Electronics Engineers (IEEE) standard P1386.

A particular example of an embodiment is a switched fabric enabled mezzanine card (XMC) 112. XMC's are described in VITA 42 promulgated by VMEbus International Trade Association (VITA), P.O. Box 19658, Fountain Hills, Ariz., 85269. In an embodiment, switched fabric enabled mezzanine card 112 can be coupled to VXS payload module 102 and communicatively couple switched fabric enabled mezzanine card 112 with VXS backplane 104 and switched fabric 106. VXS payload module 102 can include any number of switched fabric enabled mezzanine cards 112. In an embodiment, VXS payload module 102 can include up to two switched fabric enabled mezzanine cards 112, 113.

In an embodiment, switched fabric enabled mezzanine card 112 is coupled to directly communicate with VXS backplane and hence switched fabric 106. In an embodiment, switched fabric enabled mezzanine card 112 can be coupled to directly communicate with switch module 110. Directly communicate can mean that although switched fabric enabled mezzanine card 112 is coupled to VXS payload module 102, VXS payload module 102 does not control or manage switched fabric enabled mezzanine card 112. In effect, VXS payload module can omit the use of any processors or buses to control or manage switched fabric enabled mezzanine card 112. Switch module 110 controls switched fabric enabled mezzanine card 112 without any input from VXS payload module 102.

In an embodiment, switched fabric enabled mezzanine card 112 is coupled directly to VXS backplane 104 and hence switched fabric 106. In this embodiment, VXS payload module 102 acts as a carrier module for switched fabric enabled mezzanine card 112, with VXS payload module acting merely as a connection point for switched fabric enabled mezzanine card 112 to physically interface with switched fabric 106. In this embodiment, VXS payload module 102 does not have to appear as an active node on switched fabric. However, in another embodiment, VXS payload module 102 can appear as an active node on either or both of VMEbus network 108 and switched fabric 106.

In an embodiment, since switched fabric enabled mezzanine card 112 is coupled directly to switched fabric 106 and VXS backplane 104, switched fabric enabled mezzanine card 112 is coupled to directly communicate with switch module 110. Hence, in this embodiment, switch module 110 can directly control switched fabric enabled mezzanine card 112. In effect, switched fabric enabled mezzanine card 112 is an independent node 107 on switched fabric 106 that can operate on switched fabric 106 without guidance, management or interference from VXS payload module 102.

In an embodiment, VXS payload module 102 can include switched fabric enabled mezzanine card 112 that only interfaces with switched fabric 106. In another embodiment, VXS payload module 103 can include switched fabric enabled mezzanine card 120 that interfaces and communicates with both switched fabric 106 and VMEbus network 108. In another embodiment, VXS payload module 105 can include a switched fabric enabled mezzanine card 122 that communicates only with switched fabric 106, and a VMEbus network mezzanine card 126 that only communicates with VMEbus network 108. VXS payload module can include any combination of the above embodiments and be within the scope of the invention.

In an embodiment, VXS payload module 102 can include switched fabric enabled mezzanine card connection site 114 for coupling switched fabric enabled mezzanine card 112 to VXS payload module 102. Switched fabric enabled mezzanine card connection site 114 can be include any type of electrical connector to interface switched fabric enabled mezzanine card 112 to VXS payload module 102. VXS payload module 102 can also include standard VMEbus connection sites (not shown for clarity), which are known in the art. In embodiment, switched fabric enabled mezzanine card connection site 114 can be independent of VMEbus connection sites, by being a separate connector. In another embodiment, switched fabric enabled mezzanine card connection site 114 can be integral with a VMEbus connection site. The scope of the invention is not limited by these switched fabric enabled mezzanine card connection site embodiments, and other embodiments that occur to those skilled in the art are within the scope of the invention.

In an embodiment of the invention, VXS backplane 104 and VXS payload module 102 have a set of interlocking connectors designed to interlock with each other when VXS payload module 102 is placed in a slot of multi-service platform system 100. The mechanical and electrical specifications for a portion of these interlocking connectors can be found in the ANSI/VITA 1-1994 and ANSI/VITA 1.1-1997 standards cited above for VMEbus systems. For example, these standards define the mechanical envelopes P0, P1 and P2 on VXS payload module, and corresponding mechanical envelopes J0, J1 and J2 on VXS backplane 104. Connectors in the P0/J0, P1/J1 and P2/J2 mechanical envelopes interlock when payload VXS payload module 102 is placed in a slot of multi-service platform system 100.

In an embodiment, connectors in the P1/J1 and P2/J2 mechanical envelopes couple VXS payload module 102 to VMEbus network 108, while switched fabric connector 116 in the P0/J0 mechanical envelope 118 couples VXS payload module 102 to switched fabric 106. When VXS payload module 102 is placed in a slot of multi-service platform system 100 and coupled to VXS backplane 104 via connectors in the P1/J1 and P2/J2 mechanical envelopes, the functionality of VXS payload module 102 is added to multi-service platform system 100 via VMEbus network 108. For example, any mezzanine cards on VXS payload module capable of communicating with VMEbus network 108 are accessible by other payload modules in multi-service platform system 100 and visa versa.

In an embodiment, VXS payload module 102 has switched fabric connector 116 in the P0 mechanical envelope 118. VXS backplane 104 can include corresponding switched fabric connector in the J0 mechanical envelope (not shown for clarity), where switched fabric connector 116 and corresponding switched fabric connector are designed to interface and interlock when VXS payload module 102 is inserted into multi-service platform system 100. Switched fabric connector 116 and corresponding switched fabric connector are designed for use in high-speed switched fabric networks and are compatible with any of a plurality of switched fabric network standards such as InfiniBand, Serial RapidIO, FibreChannel, Ethernet, PCI Express, Hypertransport, and the like. In an example of an embodiment of the invention, switched fabric connector 116 and corresponding switched fabric connector can be a Tyco MultiGig RT connector manufactured by the AMP division of Tyco Electronics, Harrisburg, Pa. The invention is not limited to the use of the Tyco RT connector, and any connector capable of handling data using any of the plurality of switched fabric network standards is encompassed within the invention.

In an embodiment, switched fabric connector 116 is coupled directly to switched fabric enabled mezzanine card connection site 114 and enables switched fabric enabled mezzanine card 113 to be directly coupled to VXS backplane 104 and directly communicate with switched fabric 106 though switched fabric connector 116.

Figure 2:
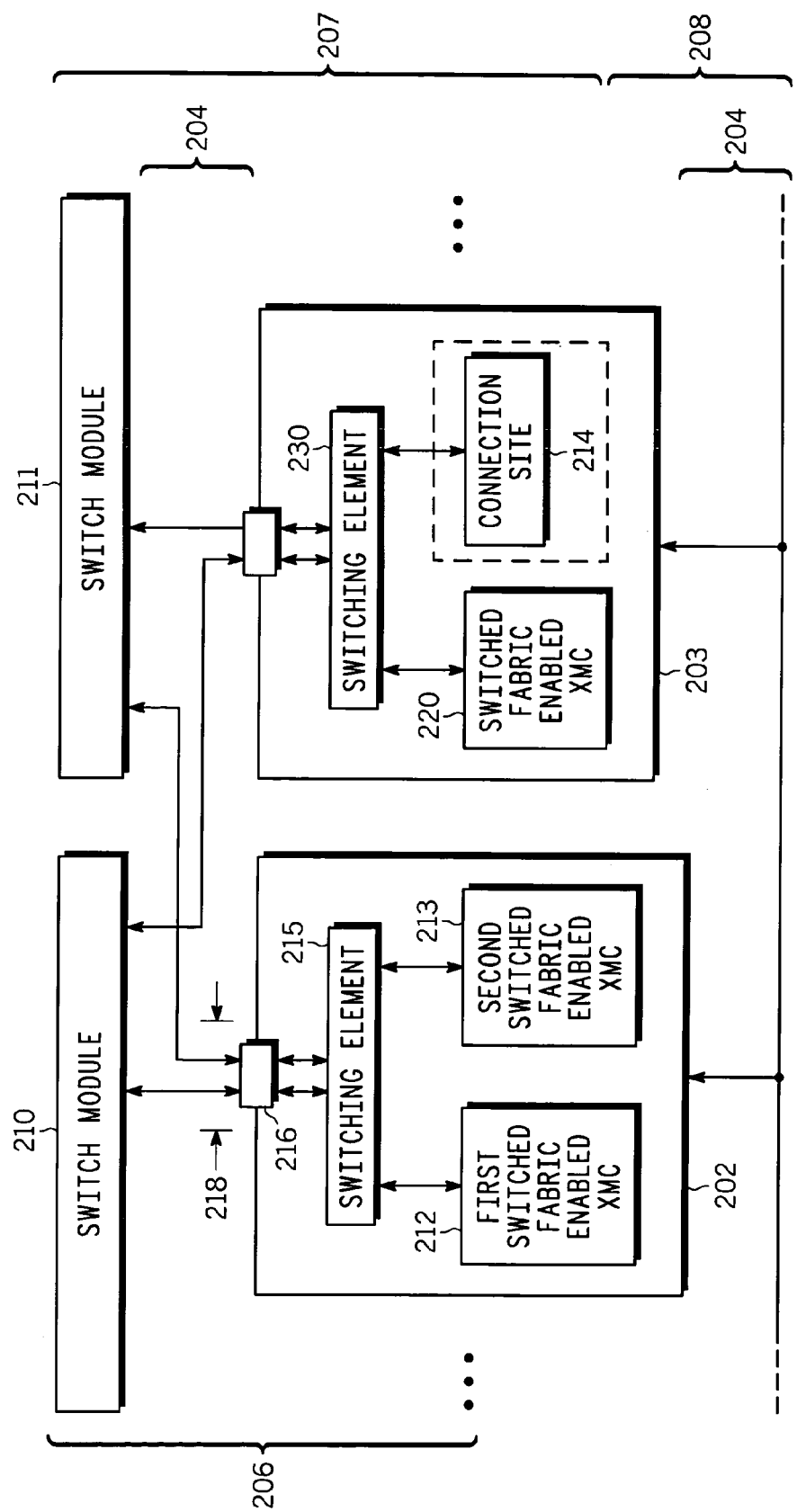
FIG. 2 depicts a multi-service platform system according to another embodiment of the invention.

FIG. 2 depicts a multi-service platform system 200 according to another embodiment of the invention. In the embodiment depicted in FIG. 2, VXS payload module 202 coupled to VXS backplane 204 can include first switched fabric enabled mezzanine card 212 and second switched fabric enabled mezzanine card 213. VXS payload module 202 can also include switching element 215 communicatively interposed between first and second switched fabric enabled mezzanine card 212, 213 and VXS backplane 204. In an embodiment, switching element 215 can act as a router for mezzanine cards on VXS payload module 202. Both first switched fabric enabled mezzanine card 212 and second switched fabric enabled mezzanine card 213 are coupled to directly communicate with switched fabric 206, 207 via switching element 215. In other words, first switched fabric enabled mezzanine card 212 and second switched fabric enabled mezzanine card 213 communicate with switched fabric 206, 207 though switching element 215.

In an embodiment, switching element 215 controls whether first switched fabric enabled mezzanine card 212 and second switched fabric enabled mezzanine card 213 are coupled to VXS backplane 204, and hence switched fabric 206, 207. In another embodiment, multi-service platform system 200 includes first switch fabric 206 and second switch fabric 207. First switch fabric 206 is controlled by first switch module 210 and second switch fabric 207 is controlled by second switch module 211. In this embodiment, switching element 215 controls whether at least one of first switched fabric enabled mezzanine card 212 and second switched fabric enabled mezzanine card 213 are coupled to either one of first switched fabric 206 and second switched fabric 207. For example, switching element 215 can couple first switched fabric enabled mezzanine card 212 to first switched fabric 206, while coupling second switched fabric enabled mezzanine card 213 to second switched fabric 207. In another example, switching element 215 can couple both first and second switched fabric enabled mezzanine cards 212, 213 to either first switched fabric 206 or second switched fabric 207. In yet another example, switching element 215 can couple either first switched fabric enabled mezzanine card 212 or second switched fabric enabled mezzanine card 213 to either first switched fabric 206 or second switched fabric 207.

Analogously to the embodiments described with reference to FIG. 1, first switch module 210 directly controls either first switched fabric enabled mezzanine card 212 or second switched fabric enabled mezzanine card 213 directly coupled to it via switching element 215. Also, first switched fabric enabled mezzanine card 212 and switched fabric enabled mezzanine card 213 can operate as independent nodes in either first switch fabric 206 or second switch fabric 207.

In an embodiment, VXS payload module 203 can include switched fabric enabled mezzanine card connection site 214 coupled to switching element 230 analogous to that described with reference to FIG. 1. Also, VXS payload module 202 can include switched fabric connector 216 in P0 mechanical envelope 218 as described with reference to the embodiments of FIG. 1.

Figure 3:
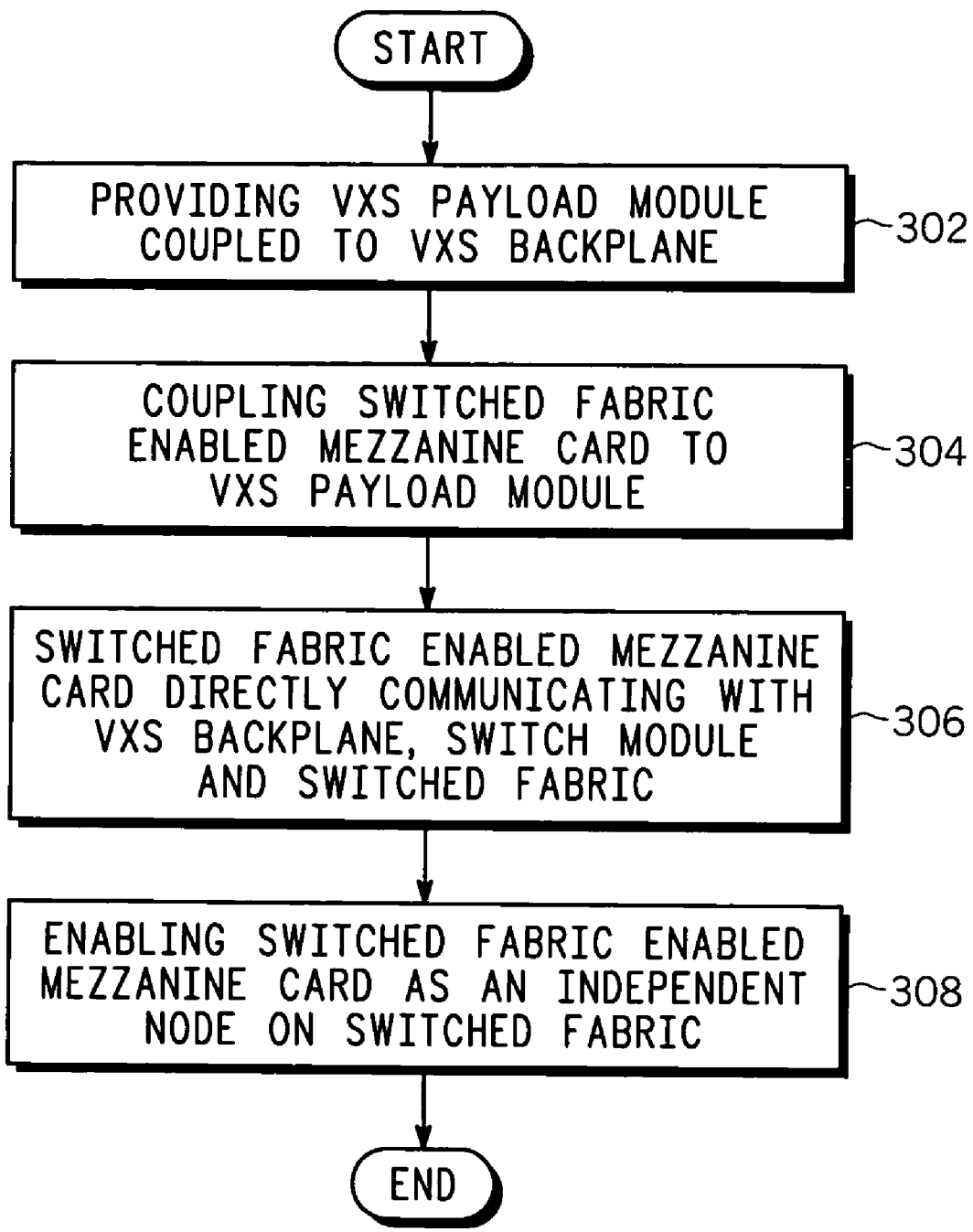
FIG. 3 illustrates a flow diagram of a method according to an embodiment of the invention.

FIG. 3 illustrates a flow diagram of a method according to an embodiment of the invention. In step 302, a VXS payload module coupled to VXS backplane is provided. In step 304, switched fabric enabled mezzanine card is coupled to VXS payload module. In step 306, switched fabric enabled mezzanine card directly communicates with VXS backplane, switch module and switched fabric. In step 308, switched fabric enabled mezzanine card is enabled as an independent node on switched fabric.

Figure 4:
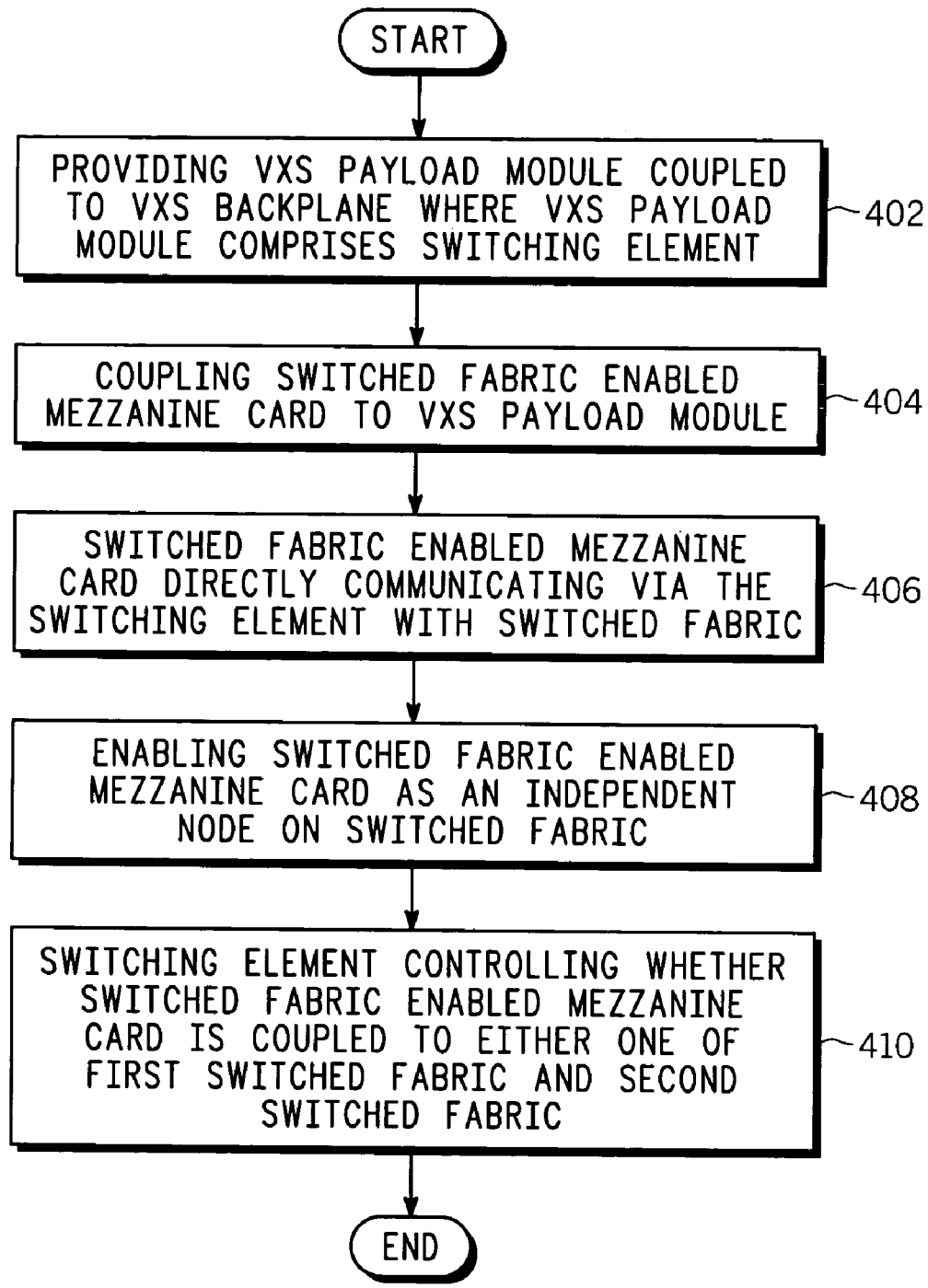
FIG. 4 illustrates a flow diagram of a method according to another embodiment of the invention.

FIG. 4 illustrates a flow diagram of a method according to another embodiment of the invention. In step 402, a VXS payload node coupled to VXS backplane is provided, where VXS payload module comprises switching element. In step 404, switched fabric enabled mezzanine card is coupled to VXS payload module. In step 406, switched fabric enabled mezzanine card communicates with VXS backplane, switch module and switched fabric via switching element. In step 408, switched fabric enabled mezzanine card is enabled as an independent node on switched fabric. In step 410, switching element controls whether switched fabric enabled mezzanine card is coupled to either one of first switched fabric and second switched fabric.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system having a VXS backplane, comprising:
    a VXS payload module coupled to the VXS backplane; and
    a switched fabric enabled mezzanine card coupled to the VXS payload module, wherein the switched fabric enabled mezzanine card is coupled to directly communicate with the VXS backplane.

2. The multi-service platform system of claim 1, further comprising a switch module coupled to the VXS backplane, wherein the switched fabric enabled mezzanine card is coupled to directly communicate with the switch module.

3. The multi-service platform system of claim 1, further comprising a switch module coupled to the VXS backplane, wherein the switch module directly controls the switched fabric enabled mezzanine card.

4. The multi-service platform system of claim 1, wherein the VXS payload module comprises a switched fabric connector, and wherein the switched fabric enabled mezzanine card is directly coupled to the VXS backplane through the switched fabric connector.

5. The multi-service platform system of claim 4, wherein the switched fabric connector is in a P0 mechanical envelope on the VXS payload module.

6. The multi-service platform system of claim 1, further comprising a switch module coupled to the VXS backplane, wherein the switch module controls a switched fabric and wherein the switched fabric enabled mezzanine card is an independent node on the switched fabric.

7. A VXS payload module, comprising:
    a switched fabric enabled mezzanine card connection site; and
    a switched fabric connector in a P0 mechanical envelope, wherein the switched fabric enabled mezzanine card connection site is directly coupled to the switched fabric connector, enabling a switched fabric enabled mezzanine card coupled to the switched fabric enabled mezzanine card site to directly communicate with a VXS backplane.

8. The VXS payload module of claim 7, wherein the switched fabric enabled mezzanine card connection site directly coupled to the switched fabric connector enables the switched fabric enabled mezzanine card to directly communicate with a switch module coupled to the VXS backplane.

9. The VXS payload module of claim 7, wherein the switched fabric enabled mezzanine card connection site directly coupled to the switched fabric connector enables a switch module coupled to the VXS backplane to directly control the switched fabric enabled mezzanine card.

10. The VXS payload module of claim 7, wherein the switched fabric enabled mezzanine card connection site directly coupled to the switched fabric connector enables the switched fabric enabled mezzanine card as an independent node on a switched fabric running on the VXS backplane.

11. A method, comprising:
    providing a VXS payload module coupled to a VXS backplane;
    coupling a switched fabric enabled mezzanine card to the VXS payload module; and
    the switched fabric enabled mezzanine card directly communicating with the VXS backplane.

12. The method of claim 11, further comprising the switched fabric enabled mezzanine card directly communicating with a switch module coupled to the VXS backplane.

13. The method of claim 11, further comprising a switch module coupled to the VXS backplane directly controlling the switched fabric enabled mezzanine card.

14. The method of claim 11, wherein coupling the switched fabric enabled mezzanine card to the VXS payload module comprises coupling the switched fabric enabled mezzanine card to a switched fabric enabled mezzanine card connection site on the VXS payload module.

15. The method of claim 14, wherein the VXS payload module comprises a switched fabric connector, and wherein coupling the switched fabric enabled mezzanine card comprises directly coupling the switched fabric enabled mezzanine card to the VXS backplane through the switched fabric enabled mezzanine card site and the switched fabric connector.

16. The method of claim 15, wherein the switched fabric connector is in a P0 mechanical envelope on the VXS payload module.

17. The method of claim 11, wherein directly communicating with the VXS backplane comprises enabling the switched fabric enabled mezzanine card as an independent node on a switched fabric running on the VXS backplane.

18. A method, comprising:
    providing a VXS payload module coupled to a VXS backplane;
    coupling a switched fabric enabled mezzanine card to the VXS payload module; and
    enabling the switched fabric enabled mezzanine card as an independent node on a switched fabric running on the VXS backplane.

19. The method of claim 18, wherein enabling comprises a switch module coupled to the VXS backplane directly controlling the switched fabric enabled mezzanine card.

20. The method of claim 18, wherein coupling comprises coupling the switched fabric enabled mezzanine card to a switched fabric enabled mezzanine card connection site on the VXS payload module.

21. The method of claim 20, wherein the VXS payload module comprises a switched fabric connector, and wherein coupling comprises directly coupling the switched fabric enabled mezzanine card to the VXS backplane through the switched fabric enabled mezzanine card site and the switched fabric connector.

22. The method of claim 21, wherein the switched fabric connector is in a P0 mechanical envelope on the VXS payload module.

* * * * *